United States Patent [19]
Nagano et al.

[11] 4,226,132
[45] Oct. 7, 1980

[54] REAR DERAILLEUR FOR A BICYCLE

[75] Inventors: Masashi Nagano, Sakai; Mitsuhide Isobe, Toyonaka, both of Japan

[73] Assignee: Shimano Industrial Company, Limited, Osaka, Japan

[21] Appl. No.: 29,303

[22] Filed: Apr. 12, 1979

[30] Foreign Application Priority Data

Apr. 17, 1978 [JP] Japan .................................. 53/45530

[51] Int. Cl.³ ............................................. F16H 7/22
[52] U.S. Cl. ...................................................... 474/82
[58] Field of Search ..................... 74/217 B, 242.11 B, 74/242.14 B, 242.15 D

[56] References Cited
U.S. PATENT DOCUMENTS

| 3,896,679 | 7/1975 | Huret et al. | 74/217 B |
| 4,051,738 | 10/1977 | Dian | 74/217 B |

Primary Examiner—C. J. Husar
Assistant Examiner—Conrad Berman
Attorney, Agent, or Firm—Stevens, Davis, Miller & Mosher

[57] ABSTRACT

A rear derailleur for a bicycle, which is provided with a holder connected between a fitting member fixed to the bicycle frame and a pantograph mechanism supported to the fitting member through a transverse stud. The holder offsets the position of a movable member with respect to the fitting member, or in other words, the position of the movable member with respect to each sprocket at the freewheel, so that when the movable member is moved axially of the freewheel to switch a driving chain to a selected sprocket, the movable member is moved radially of the freewheel. Therefore the movable member, when moved axially of the freewheel for switching a driving chain to a selected one of the sprockets, is moved radially of the freewheel.

11 Claims, 6 Drawing Figures

REAR DERAILLEUR FOR A BICYCLE

This invention relates to a rear derailleur for a bicycle, and more particularly to a rear derailleur which switches a driving chain to a selected sprocket of a multi-stage freewheel mounted to a rear hub of the bicycle to thereby change the bicycle speed.

Generally, this kind of derailleur comprises a fitting member fixed to a hub shaft, a supporting member pivoted to the fitting member through a transverse stud, two linkage members supported to the supporting member through longitudinal studs, a movable member carried by the linkage members through longitudinal studs, and guide cages having two pulleys and being carried by the movable member through a transverse stud. A first tension spring is inserted between the fitting member and the supporting member and a second tension spring is inserted between the movable member and the guide cages, so that both tension springs may apply a given tension to the driving chain and maintain a balance therebetween to set proper positions of the pulleys with respect to each sprocket.

In the derailleur, according to the foregoing, when switching the driving chain both the tension springs are balanced to shift the pulleys, especially the guide pulley at the side of the sprockets, to a predetermined position with respect to each sprocket related to the diameter thereof.

However, if both tension springs are not properly balanced, the pulleys move to a position with respect to each sprocket away therefrom or too close thereto because each sprocket is different in diameter, resulting in a speed change which is not rapid or accurate. Especially, when the driving chain is switched to a selected one of two or more sprockets at the front chain wheels of the crank, both the tension springs are unbalanced in tension moving the position of the pulley, thereby raising a problem in that the chain switching condition at the front chain wheel improperly affects the chain which is to be switched to each sprocket at the multi-stage freewheel.

In view of the aforesaid problem, this invention has been designed. An object of the invention is to provide a rear derailleur which is simple in construction so that when switching the driving chain, the guide pulley is kept in a constant position with respect to each sprocket to thereby allow the chain to be always switched rapidly and accurately, and also permitting the driving chain, even when meshing with any of the front chain wheels, to be rapidly and accurately switched to each sprocket at the freewheel without changing the positional relationship of the guide pulley with respect to each sprocket.

This invention is characterized in that between the fitting member and a pantograph mechanism supported thereto by a transverse stud a holder is provided which offsets the position of a movable member with respect to the fitting member, in other words, the position of the movable member with respect to each sprocket at the freewheel, so as to keep the movable member in a fixed position, whereby the movable member, when moved axially of the freewheel to switch the driving chain is moved radially of the freewheel.

The aforesaid pantograph mechanism comprises one supporting member, two linkage members and one movable member, these members being connected in a parallelogram through four longitudinal studs, whereby the pantograph mechanism is transformed through its parallelogram to move the movable member axially of the freewheel.

The pantograph mechanism is also pivoted to the fitting member through a first transverse stud and is not provided with the first tension spring used in the conventional derailleur, thereby being freely swingable around the transverse stud.

Guide cages having two pulleys are pivoted to the movable member through the second transverse stud and urged by the second tension spring in the direction of tensioning the driving chain guided by the pulleys, the same as in the conventional derailleur, whereby the pantograph mechanism is urged around the first transverse stud in the direction of moving the movable member radially inward (for convenience of explanation, hereinafter expressed as upwardly) of the freewheel.

At the rear derailleur constructed according to the foregoing, the holder is inserted between the fitting member and the pantograph mechanism so as to prop the pantograph mechanism to avoid resiliently swinging upwardly, as aforesaid. The holder allows the pantograph mechanism to swing downwardly against the force upwardly acting thereon, by utilizing a change in length between mounting positions of the holder to the fitting member and the pantograph mechanism resulting when the latter is transformed to move the movable member axially inwardly, i.e., toward the larger diameter sprocket, of the freewheel, whereby the movable member is forced to move radially outward (hereinafter expressed as downwardly, for the convenience of explanation) of the freewheel.

Hence, the movable member position can be kept constant with respect to the sprockets, so that the position may be offset even when the driving chain is meshed with any of the front chain wheels.

These and other object and novel features of the invention will be more apparent from the following description of an embodiment of the invention in accordance with the accompanying drawings, in which.

Figure 1:
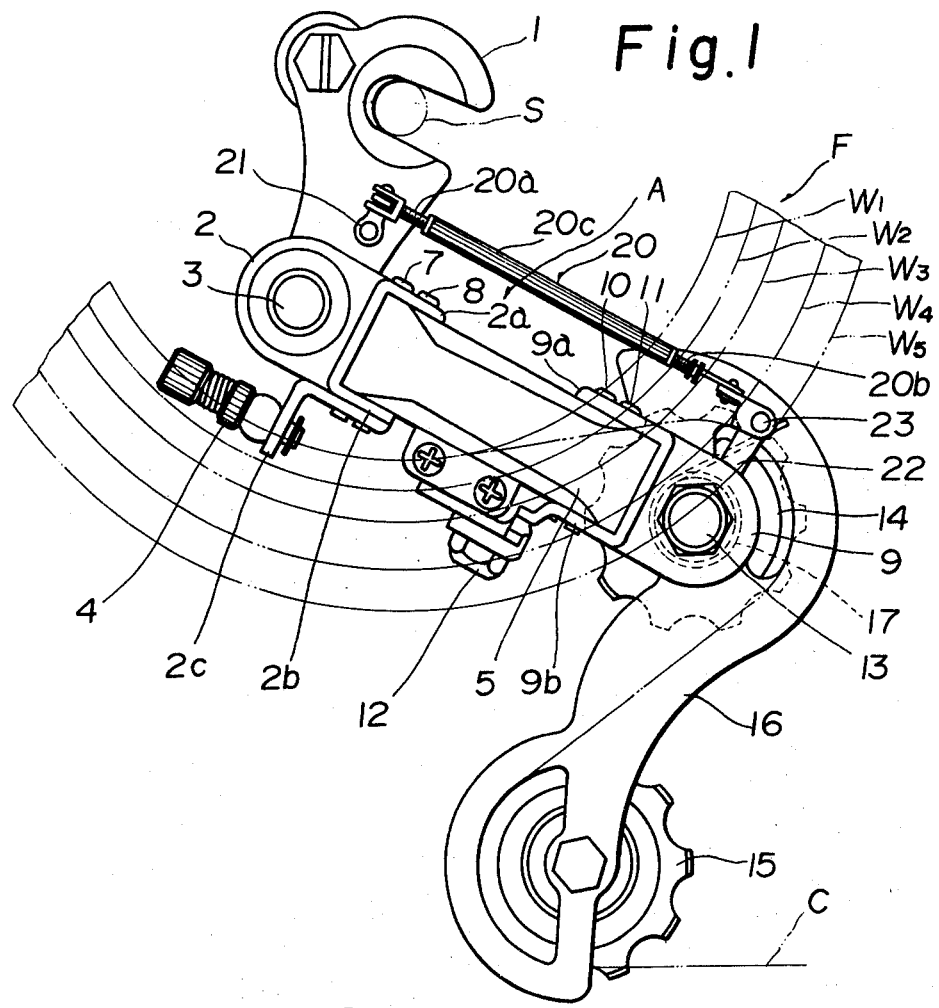
FIG. 1 is a front view of a first embodiment of the invention.

Referring to the drawings, reference numeral 1 designates a fitting member fixed to a seat stay of the bicycle together with a hub shaft of the bicycle's rear hub (not shown), and 2 designates a supporting member supported to the fixing member swingably through a first transverse stud 3.

The supporting member 2 has support arms 2a and 2b opposite to each other at a regular interval and a fitting 2c for a support 4 holding an outer sheath guiding a control wire.

Linkage members 5 and 6 are inserted at one end between the support arms 2a and 2b and supported to the supporting member 2 swingably through a first and a second longitudinal stud 7 and 8, and carry at the other ends a movable member 9 swingably through a third and a fourth stud 10 and 11.

The movable member 9 is shaped similarly to the supporting member 2 and is provided with connecting arms 9a and 9b for connecting therewith the linkage members 5 and 6, and also with a support 12 for fixing therewith one end of the control wire.

Guide cages 16 having guide and tension pulleys 14 and 15 are carried by the movable member 9 swingably through a second transverse stud 13. In the drawings, the shaft of the guide pulley 14 is in common with the second transverse stud 13, so that even when the guide cages 16 swing around the second transverse stud 13 the guide pulley 14 may not change its position. Between the guide cages 16 and the movable member 9 is provided a tension spring 17, which urges the guide cages 16 to rotate clockwise around the transverse stud 13, thereby applying the predetermined tension to a driving chain c carried on the tension pulley 15.

The tension spring 17 is formed of a coiled spring and bent at one end 17a to be hooked to the side edge of guide cages 16, and at the other end acts on the movable member 9.

The aforesaid well known construction includes a pantograph mechanism A comprising the supporting member 2, two linkage members 5 and 6, and movable member 9.

The pantograph mechanism A is formed in a parallelogram, which is transformed to move the movable member 9 axially of the freewheel F.

The control wire (not shown) is fixed to the support 12 and the outer sheath (not shown) to the support 4, and the control wire is operated to transform the pantograph mechanism A to thereby move the movable member 9 axially of the freewheel F. Hence, the driving chain C can be switched from one of the sprockets $W_1$ to $W_5$ at the freewheel F to another.

This invention is directed to provide a holder 20 at the derailleur, constructed according to the foregoing. The holder 20 is mounted between the fitting member 1 and the pantograph mechanism A to enable the movable member 9 to be kept in a particular position with respect to the fitting member 1, the position corresponding to the movable member positioned with respect to each sprocket to be meshed with the driving chain. That is, it is possible to compensate the position of movable member 9 for the particular chain shifting position regardless of the extent of the tensile strength of the tension spring 17. In other words, when moving the movable member 9 axially of the freewheel F to switch the driving chain to a selected sprocket $W_1$ to $W_5$ at the freewheel, the holder 20 allows the guide cages 16, i.e., the transverse stud 13 or guide pulley 14, to be displaced with respect to each sprocket radially of the freewheel F.

In brief, the transverse stud 13 is adapted to be displaced away from the hub shaft S when the guide cages 16 are moved from the high speed sprocket $W_1$, having the minimum diameter, to the low speed sprocket $W_5$, having the maximum diameter.

Figure 2:
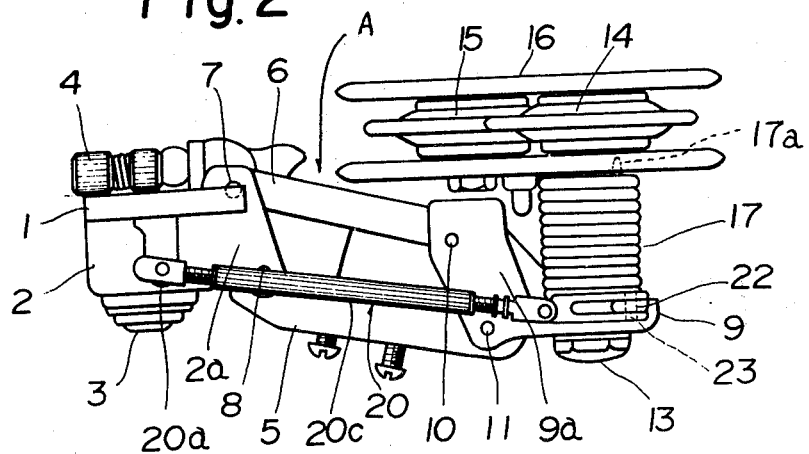
FIG. 2 is a plan view thereof.
Figure 3:
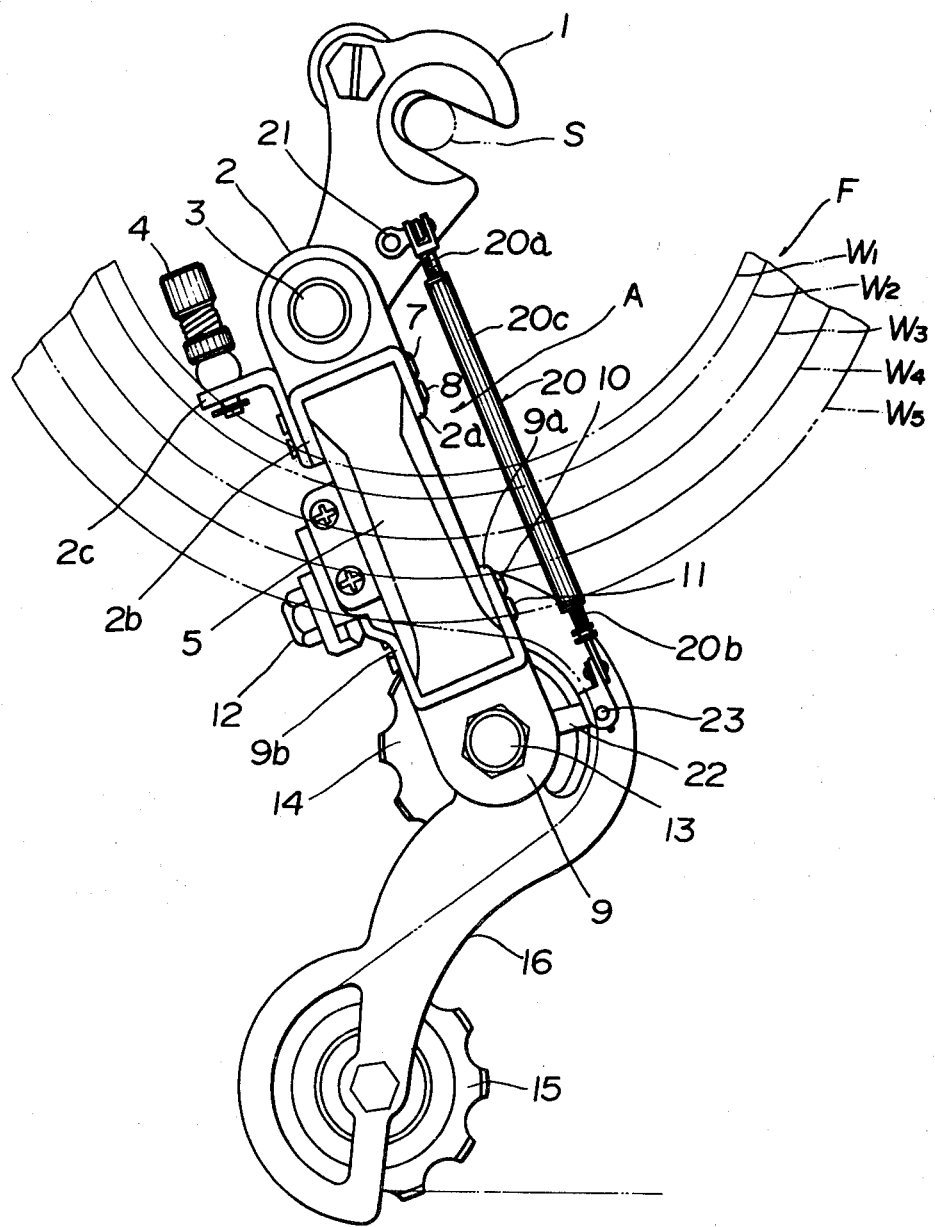
FIG. 3 is a front view showing a working condition of the embodiment in FIG. 1.

Next, a typical embodiment of the invention will be detailed in the following description. A first embodiment shown in FIGS. 1 through 3 has the holder 20 formed of an elongated member, such as a rod or pipe. The holder 20 is mounted at one end thereof to the fitting member 1 through a third transverse stud 21 and mounted at the other end through a fourth transverse stud 23 to a mounting arm 22 fixed to the movable member 9.

In this construction, the pantograph mechanism A is pivoted to the fitting member 1 through the first transverse stud 3 and is not provided with the conventional tension spring, thereby being freely movable with respect to the fitting member 1. Hence, when the driving chain C carried on both the pulleys 14 and 15 is made tense regularly by the tension spring 17, the tensile strength of the chain applies to the pantograph mechanism A the force acting upwardly, i.e., counterclockwise in FIG. 1, whereby the pantograph mechanism A tends to swing in the direction of upwardly moving at the movable member side. However, the holder 20 stands against such the swinging motion of pantograph mechanism A, thereby keeping the movable member 9 at the constant position with respect to the freewheel F. The constant position is the most suitable for the guide pulley 14 to guide the chain C to each of the sprockets $W_1$ to $W_5$ and is determined by the mounting position and length of holder 20.

Referring to FIG. 1, the holder 20 comprises a first and a second threaded rod 20a and 20b and an adjuster 20c screwable with the threaded rod 20a and 20b respectively. The first threaded rod 20a is pivoted to the fixing member 1 and the second threaded rod 20b to the mounting arm 22 through the third and fourth transverse studs 21 and 23, respectively, and the adjuster 20c can be turned to adjust the length of the holder 20.

In the condition as shown in FIG. 1, the guide cages 16 are positioned correspondingly to the high speed sprocket $W_1$. From this condition, the movable member 9 is moved to shift the guide cages 16 toward the low speed sprocket $W_5$, then a distance between the mounting positions of both ends of the holder 20, i.e., between the third 21 and fourth 23 transverse studs, is reduced.

The reason for this is that the pantograph mechanism A comprises the support member 2, linkage members 5 and 6 and movable member 9, and is connected in a parallelogram, which is transformed to move the movable member 9.

Accordingly, the aforesaid distance is reduced to force the movable member 9 to move downwardly against the aforesaid upwardly acting force because the holder 20 applies a restraining force. Hence, for compensation of the reduced distance the pantograph mechanism A swings around the first transverse stud 13 to move the second transverse stud 13 at the guide cages 16 away from the hub shaft S, thereby keeping the guide pulley 14 in the most suitable position with respect to the low speed sprocket $W_5$. It is to be noted that this condition is maintained even when the driving chain C is being switched by the front derailleur to one of two or more front chain wheels.

In addition, a return spring used in the conventional derailleur is not described in the former embodiment. Such a return spring is not used in the derailleur of the invention, but may be replaced by the tension spring 17. In other words, the upwardly acting force applied to the pantograph mechanism A and the parallelogrammic formation thereof function as the return spring. In addition, the use of return spring does not hinder the performance of the derailleur of the invention.

The mounting arm 22 for one end of the holder 20, other than fixed to the movable member 9 as aforegoing, may be swingably mounted thereto through a fifth transverse stud. In this instance, the mounting arm 22, holder 20, fitting member 1 and pantograph mechanism A, form a four parallelogrammic link mechanism. It is preferable that to the four parallelogrammic link mechanisms, preferably to the mounting arm 22, is provided a spring urging the movable member 9 radially outward, i.e., downward from the freewheel F.

By this, the movable member 9 moves axially of the freewheel to assist the pantograph mechanism A to swing downwardly.

The fifth transverse stud pivotally supporting the mounting arm 22, other than provided at the movable member 9, is preferred to be replaced by the second transverse stud 13 as shown in FIG. 1. In this instance, the mounting arm 22 is provided with a hole and is pivotally supported therethrough to the second transverse stud 13.

In addition, it is preferable that the tension spring 17 is extended at its one end and retained therewith to the mounting arm 22, thereby urging the movable member 9 at the four parallelogrammic link mechanism radially outward from the freewheel F. In this instance, the guide cages 16 in swinging motion increases the force urging the holder 20, thereby further ensuring radial movement of the movable member 9 with respect to the freewheel F.

Next, the second and third embodiments will be described on the basis of FIGS. 4 and 6.

The holders 20 for these embodiments are each formed of a spring wire in place of the elongated member of the first embodiment, and are basically similar thereto.

The spring wire, when in use, mainly utilizes the tension spring 17, which is extended at one end thereof to be supported to the fitting member 1.

Figure 4:
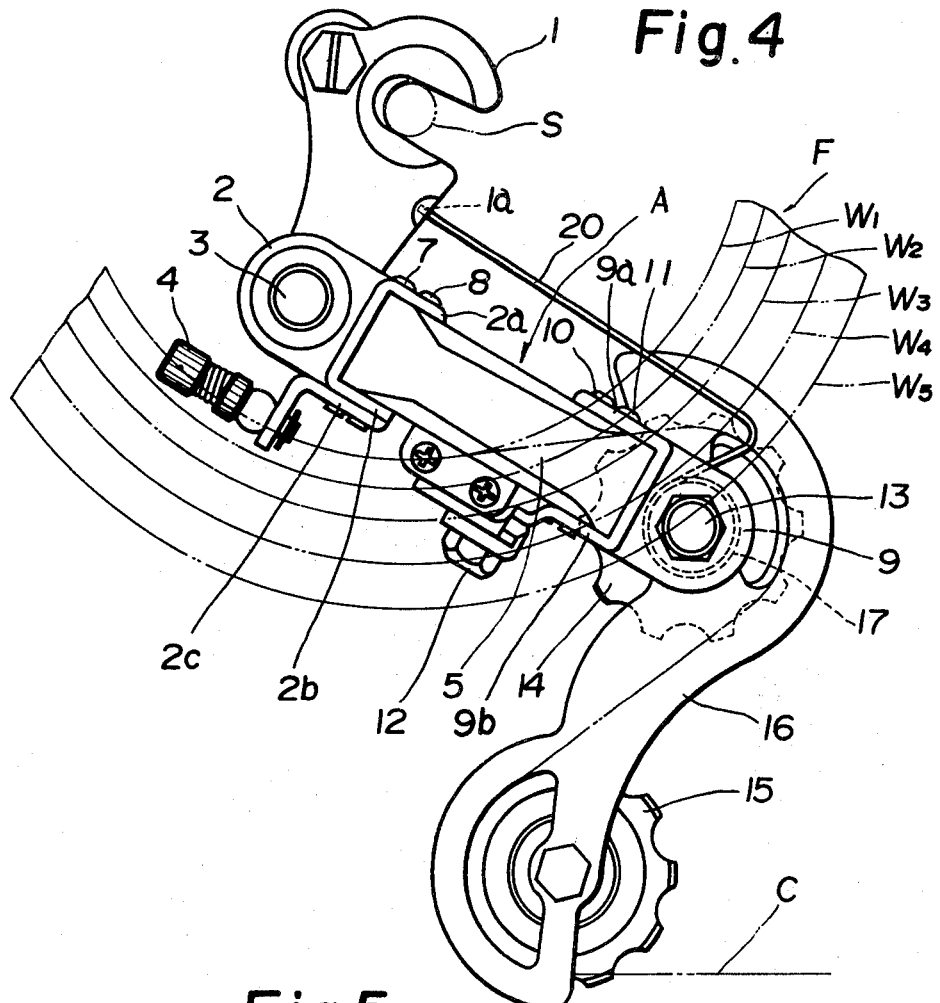
FIG. 4 is a front view of a second embodiment of the invention.
Figure 5:
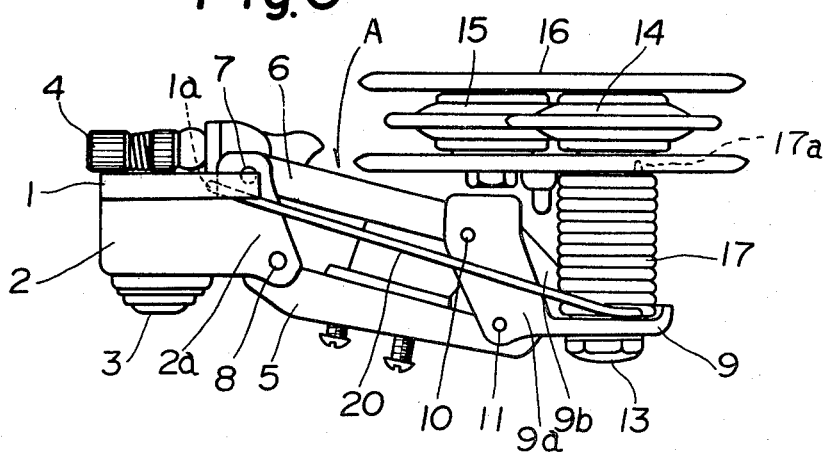
FIG. 5 is a plan view thereof.

In the second embodiment shown in FIGS. 4 and 5, the holder 20 formed of an extension of tension spring 17 is supported to the fitting member 1, the extension being fit at one end into a recess 1a provided at the fixed side of fitting member 1 to the bicycle frame with respect to the pivot of first transverse stud 3. In this instance, the holder 20 of the extension of spring 17 readily applies to the pantograph mechanism A the force urging the movable member 9 radially outwardly, i.e., downwardly of the freewheel F.

Figure 6:
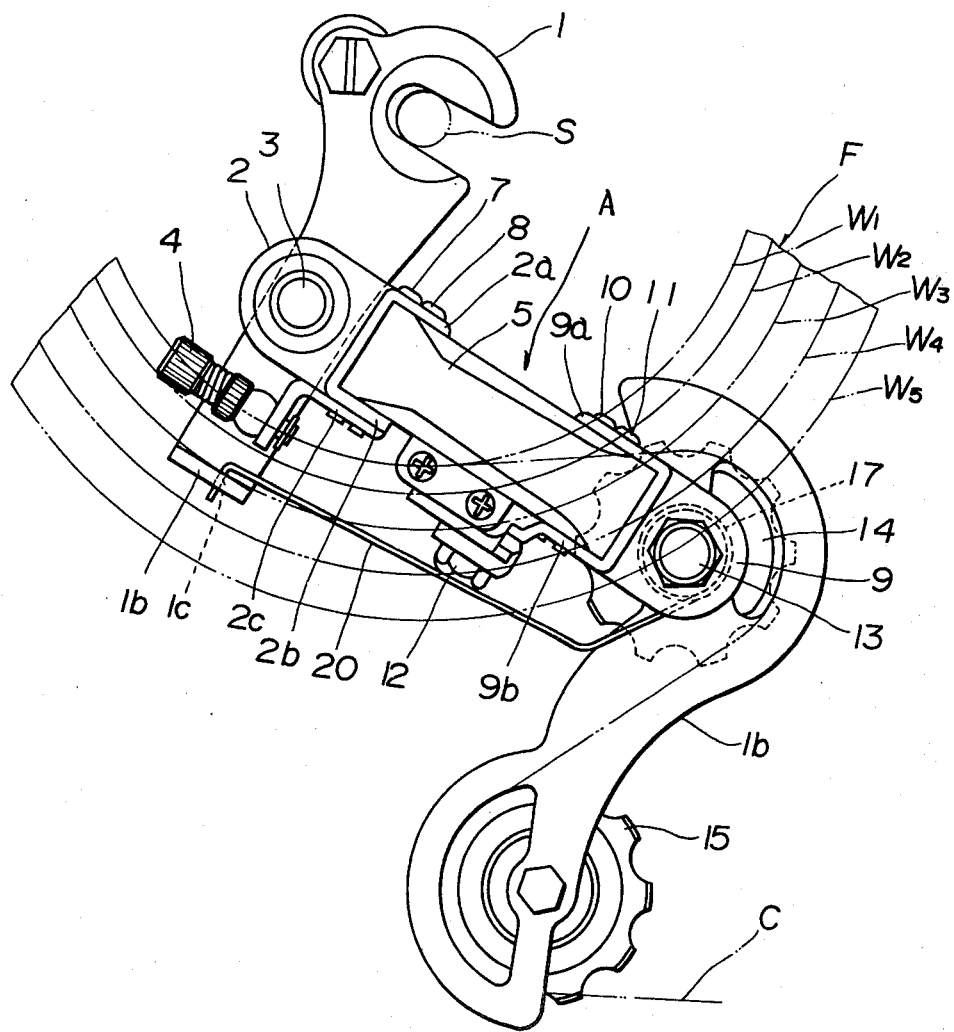
FIG. 6 is a front view of a third embodiment of the invention.

The third embodiment shown in FIG. 6 has the holder 20 formed of an extension of tension spring 17 extending toward the fitting member 1 at a side reverse to its mounting side to the bicycle frame with respect to the pivot of first transverse stud 3.

At the fitting member 1 is formed at its reverse side to the bicycle frame a tongue 1b having a bore 1c into which a bent end of the holder 20 is inserted, thereby being hooked to the fitting member.

The holder 20 at the third embodiment also applies to the pantograph mechanism A the force acting on the movable member 9 to be moved radially outward, i.e., downwardly of the freewheel F, which is readily applicable by use of the extension of tension spring 17 as the same as the second embodiment.

As seen from the second and third embodiments, the holder 20 has the force urging the movable member 9 downwardly of the freewheel F to thereby improve the follow-up capacity of movable member 9 when moving with respect to the freewheel for switching the driving chain to a selected sprocket at the freewheel F.

In addition, the aforesaid embodiments have the holder 20 attached at the other end thereof to the movable member 9. Besides this, the holder 20 may be mounted to the linkage member 5 or 6; the longitudinal stud 10 or 11 for connecting the movable member 9 with the linkage member 5 or 6; or a separate member mounted to the linkage member 5 or 6, movable member 9 or supporting member 2.

Furthermore, spring means other than the tension spring 17, may be used for applying to the holder 20 the force acting downward on the movable member 9. The spring wire forming the holder 20 may be separate from the tension spring 17. Also, the holder 20 made of spring wire, when elastically acting axially to the hub shaft 2, further ensures restoration of the pantograph mechanism A.

As clearly understood from the aforesaid description, the rear derailleur of the invention is so simply constructed as to provide only a holder between the fitting member and the pantograph mechanism and utilizes the movement of the movable member axial of the freewheel by transforming the pantograph mechanism in a parallelogram, thereby offsetting the movable member in the constant position with respect to each sprocket at the freewheel, resulting in keeping the guide cages, especially the guide pulley, in a constant position with respect to the sprocket. Hence, the driving chain is always able to be switched rapidly and accurately for changing the bicycle speed.

Furthermore, in a case where the multi-stage speed change device comprising the combination of the front chain wheel of two or more sprockets is used with the freewheel at the rear hub, the driving chain, even when switched to each sprocket of the front chain wheel, the guide cages, i.e., the guide pulley, are not at all changed in position with respect to each sprocket at the freewheel. As a result, the chain can always be switched rapidly and accurately to each sprocket at the freewheel regardless of the chain switching to the front chain wheel.

While preferred embodiments of the invention have been described using specific terms, such description is for illustrative purpose only, and it is to be understood that changes and variations may be made without departing the spirit or scope of the following claims.

What is claimed is:

1. A rear derailleur for a bicycle, which is adapted to switch a driving chain to a sprocket of a multi-stage freewheel attached to a rear hub of the bicycle, said derailleur comprising;

(a) a fitting member fixed to the bicycle frame;

(b) a pantograph mechanism swingably supported to said fitting member through a first transverse shaft; said pantograph mechanism comprising a supporting member pivoted to said fitting member through said first transverse shaft, two linkage members pivoted to said supporting member through first and second longitudinal shafts, and a movable member pivoted to said linkage members through third and fourth longitudinal shafts, said supporting member, two linkage members and movable member, being formed in a parallelogram, whereby said parallelogram is transformed to allow said movable member to move axially of said freewheel;

(c) guide cages having two pulleys and being supported swingably to said movable member at said pantograph mechanism through a second transverse shaft;

(d) urging means for urging said guide cages in the direction of applying tension to said driving chain guided by said pulley;

(e) a holder provided between the fitting member and said pantograph mechanism, said holder holding said pantograph mechanism in a particular position with respect to said fitting member to thereby offset the position of said movable member with respect to each of the sprockets at said freewheel, so that when said movable member is moved axially of said freewheel to switch said driving chain to one of said sprockets said movable member is moved radially of said freewheel.

2. A rear derailleur for a bicycle according to claim 1, wherein said holder comprises an elongated member pivoted at one lengthwise end thereof to said fitting member and at the other lengthwise end to one member at said pantograph mechanism through a third and a fourth transverse shaft respectively, said holder, fixing member and pantograph mechanism, constituting a linkage mechanism.

3. A rear derailleur for a bicycle according to claim 2, wherein said holder comprises first and second screw threaded rods and one adjusting body having a screw thread screwable with threads at said screw threaded rods, said first threaded rod being pivoted to said fixing member through said third transverse shaft, said second threaded rod being pivoted to said pantograph mechanism through said fourth transverse shaft, and said first and second threaded rods are screwably connected with said adjusting body to thereby allow said holder to be adjustable in length.

4. A rear derailleur for a bicycle according to claim 2, wherein a mounting body is located between said one member of said pantograph mechanism and said fourth transverse shaft, said mounting body being pivotally mounted to said one member and pivoted to said fourth transverse shaft, said holder, fitting member, pantograph mechanism, and mounting body forming a parallelogrammic link mechanism.

5. A rear derailleur for a bicycle according to claim 4, wherein said parallelogrammic link mechanism is provided with spring means urging said movable member radially outward from said freewheel.

6. A rear derailleur for a bicycle according to claim 4, wherein said mounting body is pivotally supported to said pantograph mechanism by said second transverse shaft pivotally supporting said guide cages to said movable member.

7. A rear derailleur for a bicycle according to claim 6, wherein said spring means for urging said guide cages in the direction of applying tension to said pulleys has an extension, said extension acting on said mounting body so that said spring means may urge said movable member at said four parallelogrammic link mechanism radially outward from said freewheel.

8. A rear derailleur for a bicycle according to claim 1, wherein said holder is formed of a wire material elastically deformable.

9. A rear derailleur for a bicycle according to claim 8, wherein said holder is formed of an extension of said spring means which applies tension to said driving chain.

10. A rear derailleur for a bicycle according to claim 9, wherein said holder formed by extending said spring means is supported to said fitting member at the fixing side thereof to said frame with respect to said first transverse shaft pivotally supporting said pantograph mechanism to said fitting member, whereby said holder is supported to said fitting member to apply to said pantograph mechanism the force allowing said movable member to move radially outwardly of said freewheel.

11. A rear derailleur for a bicycle according to claim 9, wherein said fitting member includes a hook body formed on the side of said fitting member opposite the bicycle frame extending perpendicular to said fitting member, and said hook body carries a holder formed by extending said spring means, thereby applying to said pantograph mechanism the force allowing said movable member to move radially outwardly of said freewheel.

* * * * *